United States Patent [19]
Starr et al.

[11] 3,778,215
[45] Dec. 11, 1973

[54] ROTATIONAL MOULDING MACHINE WITH INNER AND OUTER MOLD CAGES ROTATING ABOUT INTERSECTING AXES

[75] Inventors: Anthony J. Starr; Gustave A. Shindel, both of Wilmington; Harry G. Keith, Jr., New Castle, all of Del.

[73] Assignee: Container Corporation of America, Chicago, Ill.

[22] Filed: Sept. 1, 1972

[21] Appl. No.: 285,610

[52] U.S. Cl. .............................. 425/435, 164/116
[51] Int. Cl. .............................................. B28b 1/20
[58] Field of Search ..................... 425/435; 164/116, 164/289; 249/137

[56] References Cited
UNITED STATES PATENTS
2,946,092  7/1960  Yoder .......................... 249/137 X
2,972,524  2/1961  Ross ............................ 164/289 X
3,413,687  12/1968  Bavers ........................ 425/434 X FOREIGN PATENTS OR APPLICATIONS
923,152  2/1947  France .......................... 164/116

*Primary Examiner*—Robert D. Baldwin
*Attorney*—Carpenter, Ostis & Lindberg

[57] ABSTRACT

A machine for moulding a body by rotating a mould about a pair of intersecting axes comprises a pair of frames supporting an outer mould cage for rotation about the first of said axes, and an inner mould cage supported along exterior cylindrical surfaces thereof within the outer mould cage and supporting a mould for rotation with said inner mould cage about the second of said axes. Driving means for both of the cages is mounted on one of the frames and turns about a single axis and comprises a first driving shaft operatively connected to the outer mould cage to rotate same about the first axis, and a second drive shaft nesting with the first driving shaft and having an operative connection with the inner mould cage for rotating same about the second axis. The operative connection between the inner mould cage and the second driving shaft comprises an endless driven member supported on the cylindrical surfaces of the inner mould cage, and a driving member fast on the second driving shaft and engageable with the endless driven member. The mould is capable of being adjusted in its position within the inner mould cage, so that the machine at all times operates in a condition substantially of both static and dynamic balance.

4 Claims, 9 Drawing Figures

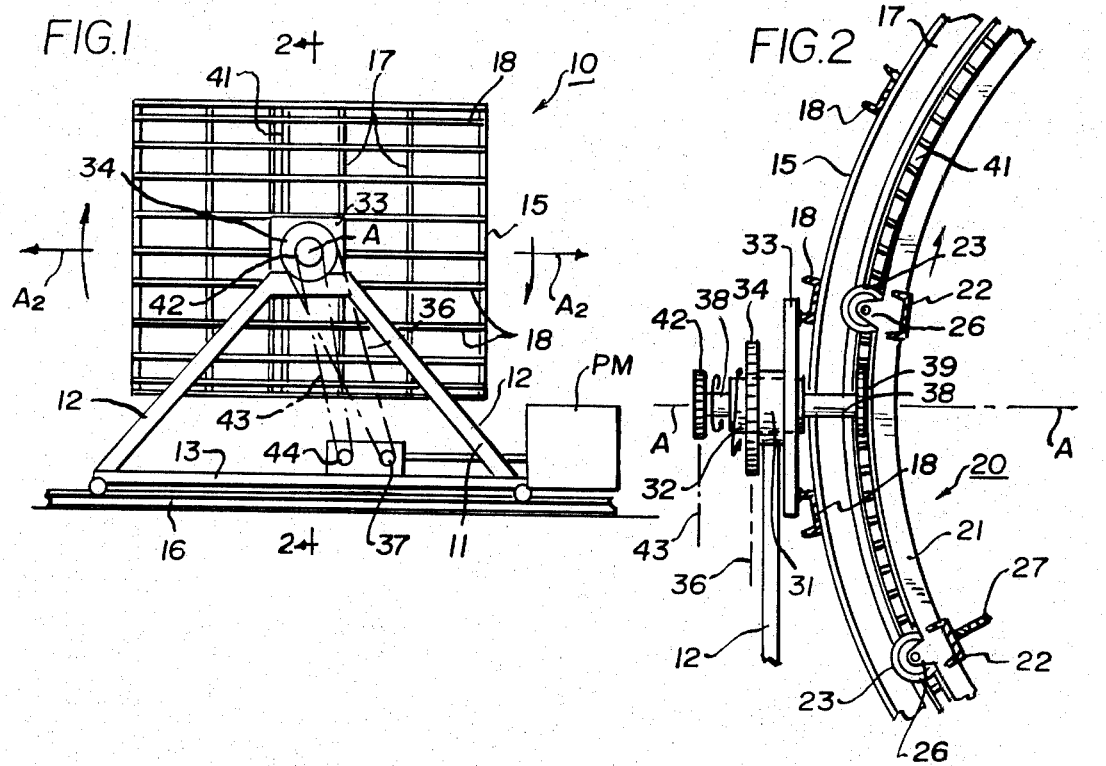
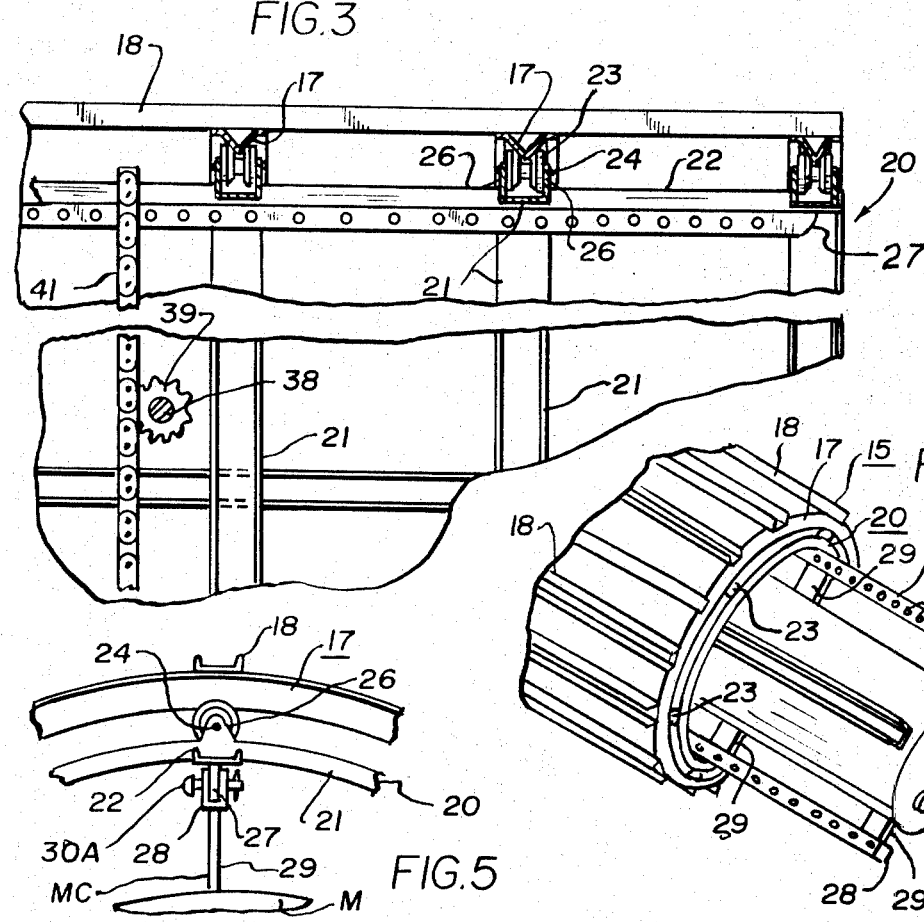

3,778,215

ROTATIONAL MOULDING MACHINE WITH INNER AND OUTER MOLD CAGES ROTATING ABOUT INTERSECTING AXES

BACKGROUND OF THE INVENTION

1. Field of the Invention

The structure according to the present invention is especially applicable to the moulding of a hollow vessel or other shape with a resinous moulding powder or liquid capable of flowing within a mould as it rotates about a pair of axes, the moulding material and the mould being in an ambient where the moulding material may flow freely to cover all interior surfaces of the mould.

2. The Prior Art

Bavers U.S. Pat. No. 3,413,687 is an example of a machine for rotational moulding where the mould rotates about a pair of intersecting axes. However, this patent does not teach an arrangement whereby the mould per se is capable of being locked within a mould cage so that the machine is in a condition of substantial static and dynamic balance at all times.

SUMMARY OF THE INVENTION

The structure according to the present invention comprises an outer mould cage rotatable about a first axis and an inner mould cage rotatable about a second axis, a mould being adjustable within the inner mould cage. The outer mould cage is supported by a trunnion assembly, one of such assemblies driving the two cages and consisting of an outer or quill shaft drivably connected to the outer mould cage, and a second driving shaft nested within the quill shaft and having a driving connection with an endless driven member secured to the inner mould cage. Preferably, the endless driven member is in the form of an endless sprocket chain, arranged much in the fashion of a crown gear with the chain rollers thereof arranged in a plane normal to the axis of the inner mould cage. The second driving shaft has a sprocket at one end thereof meshing with the chain rollers of the endless sprocket chain.

Structure is also provided for adjusting the position of the mould within the inner mould cage so that the machine is in substantially dynamic and static balance at all times.

THE DRAWINGS

FIG. 1 is a side elevational view of the moulding machine according to the present invention;

FIG. 2 is a view looking generally in the direction of the arrows 2—2 of FIG. 1;

FIG. 3 is an enlarged elevational view through the inner and outer mould cages of the machine of FIG. 1, certain parts being shown in section;

FIG. 4 is a perspective view showing the manner in which the mould is supported within the inner mould cage, the latter in turn being supported within the outer mould cage;

FIG. 5 is a detailed view showing the manner in which the mould is supported within the inner mould cage which in turn is supported for rotation within the outer mould cage;

Figure 8:
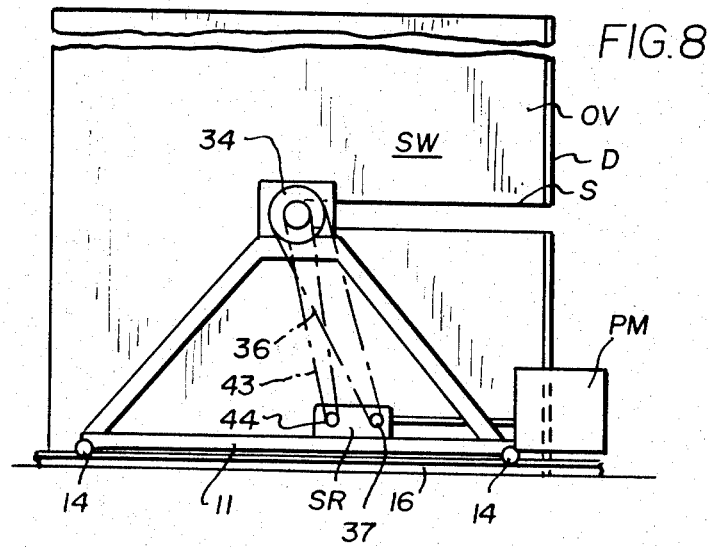
FIG. 8 is an elevational view showing the machine in relationship to a heating oven.

The improved moulding machine according to the present invention is denoted generally by the reference numeral 10 and is mounted upon a pair of frames 11 consisting of converging frame members 12 extending from a base frame member 13. Each frame 11 is mounted for movement upon front and rear wheels 14 engaged with one of a pair of laterally spaced rails 16.

Machine 10 includes an outer mould cage 15 mounted between the frames 11 for rotation about an axis A seen in FIG. 2. Outer mould cage 15 is formed from a series of spaced cylindrical hoop-like members 17 which are maintained in spaced relationship by channel members 18 spaced at equal distances about the periphery of members 17.

An inner mould cage 20 is supported along the exterior cylindrical surface thereof within the outer mould cage 15 and supports a mould M for rotation with inner mould cage 20 about the second of said axes, said second axis being denoted by $A_2$. Inner mould cage 20 is comprised of a series of hoop-like members 21 spaced from each other by longitudinally extending stringer members 22. Inner mould cage 20 is arranged to rotate with respect to outer mould cage 15 by means of spaced idler rollers 23 mounted on shafts 24, each shaft 24 being supported in spaced bracket arms 26, extending at spaced intervals about the perpheries of at least two of the members 21. As seen in FIG. 3, each member 17 has a V-shaped cross section, and each idler roller 23 is adapted to engage with a member 17.

Certain of the stringer members 22 have arms 27 extending inwardly therefrom each of such arms 27 being engaged by a clevis 28 integral with an arm 29 extending radially from the mould M and forming a mould carriage MC as seen more particularly in FIG. 4. Clevis 28 has a series of apertures 30 therein, and member 27 has like spaced apertures, now shown, there being a pin 30A extending through the aligned apertures to hold the mould carrier MC in position as desired within the inner mould cage 20, so that the assembly may be statically balanced, and also substantially dynamically balanced during operation.

Structure is provided for driving both the outer mould cage 15 and the inner mould cage 20 while being mounted on frames 11 and includes driving means including a prime mover PM connected to a speed reducer SR. A first driving shaft 32 is mounted to rotate within a pillow block 31 mounted at the inner ends of the frame members 12. Pillow block 31 supports shaft 32 which is driven by a sprocket 34 connected to the speed reducer SR to an endless sprocket chain 36, the latter being connected to an output sprocket 37 of speed reducer SR. The inner end of the hollow shaft 32 is fast with a trunnion 33 welded as seen in FIG. 2 to adjacent pairs of members 18.

It should be understood at this point that the opposite side of the outer mould cage 15 is supported in like fashion excepting that such support at the opposite side of the assembly thus far described is merely an idler one.

Structure is provided for driving the inner mould cage 20 with respect to the outer mould cage 15, and to this end a drive shaft 38 for the inner mould cage 20 has a driving sprocket 39 secured to the inner end thereof. The latter is drivably connected to an endless driven member 41 which in this case is a sprocket chain wrapped about the inner mould cage 20 in such a fashion that the rollers thereof lie in a plane normal to the axis of rotation of inner mould cage 20. Driving shaft 38 for the inner mould cage 20 is connected to the speed reducer SR through the medium of sprocket 42, an endless sprocket chain 43, and an output driving sprocket 44 at speed reducer SR.

It is believed evident that the mechanism thus far described is operable to cause the outer mould cage 15 to rotate about the axis A seen in FIG. 2, while inner mould cage 20 is arranged to operate about axis $A_2$ seen in FIG. 4. Prior to the operation, the mould M supported by the mould carrier MC is adjusted in its position within mould cage 20 to achieve static and dynamic balance. Details of the mould M are not shown, but it is enabled to be filled with moulding material at filler openings FO seen in FIG. 4.

During the operation of the entire mechanism described, the thrusts incident to the shifting in position of the material within the mould M and inner mould cage 20 can be taken by the V-cross section hoop-like members 17.

Figure 6:
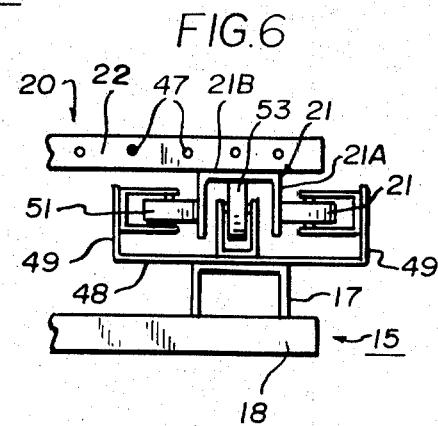
FIG. 6 is a detailed elevational view showing an alternate construction for supporting the inner mould cage within the outer mould cage, and showing details of structure for taking the thrust incident to the rotation of the two cages with respect to each other.
Figure 7:
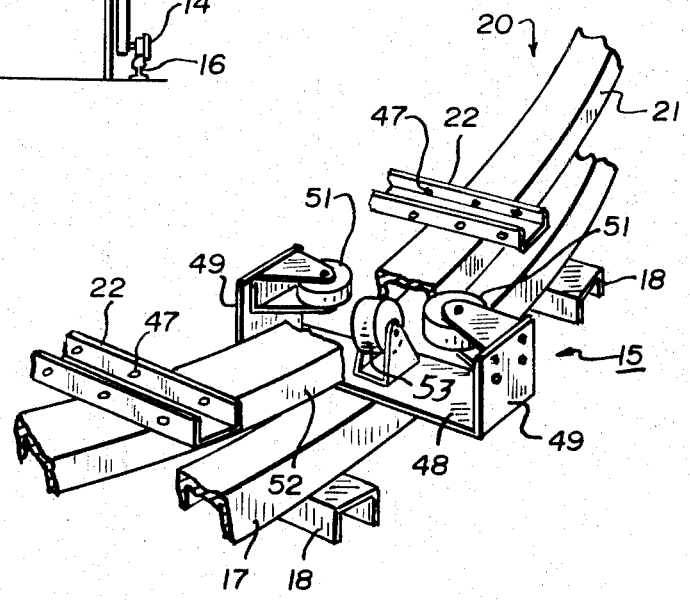
FIG. 7 is a detailed isometric view of the structure of FIG. 6.

Referring now to FIGS. 6 and 7, there is shown an alternate arrangement whereby the thrusts created by the inner mould cage 20 are transmitted to outer mould cage 15 and the hoop-like members 17 and the longitudinally extending members 18 thereof. A bracket 48 having spaced arms 49 is secured to hoop-like members 17, each of such arms 49 supporting an idler roller 51 engageable with flanges 21A of hoop members 21 of inner mould cage 20. The weight of inner mould cage 20 is supported by an idler roller 53 engageable with a web 21B of hoop member 21, each of the members 21 being secured to the members 22, as has been previously described. As with the embodiment seen in FIG. 4, certain of the longitudinally extending members 22 may be provided with apertures 47 to receive the arms 29 of the motor carrier MC.

It will be appreciated that the structure described with reference to FIGS. 6 and 7 is disposed at opposite ends of inner mould cage 20, and that four such structures (preferably) are located at each end.

Figure 9:
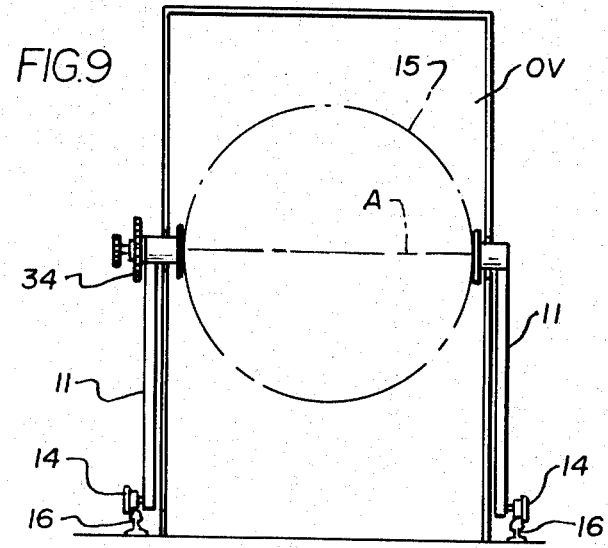
FIG. 9 is an end view of FIG. 8.

Referring now to FIGS. 8 and 9, the structure previously described may be arranged to operate within a heated ambient provided by an oven OV, side walls SW of the oven OV each having a slot S therein whereby only the outer mould cage 15, the inner mould cage 20 and the mould M are within the heated ambient thereby preventing overheating of the prime mover PM and the speed reducer SR, which in such a construction would be disposed outside the oven OV.

The oven space is closed by a door D which can be raised for entry and removal of the machine 10 from oven OV.

I claim:

1. In a machine for moulding a body by rotating a mould about a pair of intersecting axes:
   a. a frame for supporting an outer mould cage for rotation about the first of said axes;
   b. an inner mould cage supported along exterior cylindrical surfaces thereof within the outer mould cage and supporting a mould for rotation with said inner mould cage abut the second of said axes;
   c. driving means for both of said cages mounted on said frame and turning about a single axis,
   d. said driving means comprising:
      i. a first driving shaft operatively connected to said outer mould cage to rotate the same about said first axis;
      ii. a second driving shaft nesting with said first driving shaft and having an operative connection with said inner mould cage to rotate the same about said second axis;
   e. said operative connection between said inner mould cage and said second driving shaft comprising an endless driven member supported on the cylindrical surfaces of said inner mould cage and a driving member mounted on said second driving shaft and engageable with said endless driven member.

2. The machine according to claim 1 wherein said endless driven member is a sprocket chain having load transmitting elements lying in a plane normal to the axis of said inner mould cage.

3. The machine according to claim 1 wherein said mould cage is provided with means for adjusting the position thereof within said inner mould cage.

4. The machine according to claim 1 wherein said outer and inner mould cages are provided with means for taking the thrusts incident to the change in position of said outer and inner mould cages during rotation thereof.

* * * * *